United States Patent Office 2,975,178
Patented Mar. 14, 1961

2,975,178
PREPARATION OF TRICHLORO-CYANURIC ACID

Robert Hügel and Adolfo Pasetti, Milan, Italy, assignors to Montecatini-Societa Generale per l'Industria Mineraria e Chimica, a corporation of Italy No Drawing. Filed Jan. 28, 1958, Ser. No. 711,571

Claims priority, application Italy Feb. 5, 1957

7 Claims. (Cl. 260—248)

This invention relates to the preparation of trichloro-cyanuric acid.

It is known that, by introducing chlorine into an ice-cold aqueous solution of 1 mol cyanuric acid, containing also 3 mols of 5% sodium or potassium hydroxide (Beilstein, 26, 256), the formation of trichloro-isocyanuric acid occurs.

In British Patent 634,801 (1950) it is stated that completely chlorinated products cannot be obtained by this method; when operating with amounts higher than 3 g., under-chlorinated products are always obtained. In the same patent a chlorination process is claimed wherein ultraviolet light acts upon a thin layer of the material; the yield obtainable by this process is 60%.

We have now found that yields higher than that of the aforementioned British patent, which is the highest yield found in literature, can be readily obtained according to the following method.

An excess of sodium bicarbonate is suspended in a saturated aqueous sodium bicarbonate solution. This suspension, kept at a temperature between 0° C. and room temperature, is then saturated with chlorine. After the introduction of chlorine has been continued until a pH 3.3 is reached, an aqueous sodium cyanurate solution is drop-wise added; the pH of the final reaction mixture is 4.6. The temperature is held at about 0° C. Still more advantageous is to continue the introduction of chlorine during the addition of sodium cyanurate.

The term sodium cyanurate signifies the reaction product of 1 mol cyanuric acid and 3 mols sodium hydroxide, as indicated above. It is tri-sodium cyanurate.

A precipitate of trichloro-cyanuric acid, having a chlorine content corresponding to the theoretical content, is formed, while all the inorganic salts are dissolved.

A yield of about 95% is obtained.

*Example*

250 g. sodium bicarbonate is added to 1000 cc. water; this suspension is saturated with gaseous chlorine while agitating. In the meantime, a solution has been prepared, consisting of:

| | Grams |
|---|---|
| Water | 1000 |
| Cyanuric acid | 100 |
| Sodium hydroxide | 93 |

This solution is added drop-wise to the aforementioned suspension. The reaction mixture is kept at a temperature between 0 and 5° C. while the introduction of gaseous chlorine is continued so that the reaction mixture is always saturated with chlorine.

The precipitate of trichloro-isocyanuric acid which forms is filtered off, washed with cold water and dried. 170 g. of the product, having a substantially theoretical chlorine content, are obtained. The yield is about 95%.

We claim:

1. The process of preparing trichloro-isocyanuric acid which comprises preparing a suspension of sodium bicarbonate in a saturated solution of said sodium bicarbonate, the suspension comprising an excess of sodium bicarbonate suspended in a saturated aqueous sodium bicarbonate solution, adjusting the temperature of said suspension to about 0° C., saturating said suspension with chlorine gas, adding an aqueous sodium cyanurate solution slowly to said suspension while stirring and maintaining the temperature of the reaction mixture between 0 and 5° C., continuing the introduction of chlorine gas while adding said sodium cyanurate solution, and separating, washing and drying the resulting precipitate, said sodium cyanurate solution being the reaction product in water of about 1 mol cyanuric acid and 3 mols sodium hydroxide.

2. The process according to claim 1, wherein the reaction is continued until the reaction mixture attains a pH of 4.6.

3. A process of preparing trichloro-cyanuric acid, comprising chlorinating a suspension of sodium bicarbonate in water, said suspension comprising a saturated aqueous sodium bicarbonate solution containing sodium bicarbonate in excess of that soluble in said water, the chlorine being contacted with the suspension, which is at a temperature between 0° C. and room temperature, until a pH of about 3.3 is obtained, then adding, increment-wise, an aqueous solution of sodium hydroxide and cyanuric acid, the latter being in the molecular ratio of three to one in said aqueous solution added, while keeping the temperature between 0° and 5° C., chlorine being also added during the addition of said aqueous solution.

4. A process of preparing trichloro-cyanuric acid, comprising treating with chlorine a suspension of sodium bicarbonate in water, said suspension comprising a saturated aqueous sodium bicarbonate solution containing sodium bicarbonate in excess of that soluble in said water, chlorine being added until a pH of 3.3 is obtained, then adding an aqueous solution of sodium hydroxide and cyanuric acid, the latter being in the molecular ratio of three to one in said aqueous solution added, while keeping the temperature between 0° and 5° C., chlorine being also added during the addition of said aqueous solution.

5. A process of preparing trichloro-cyanuric acid, comprising saturating a suspension of sodium bicarbonate in water with chlorine, said suspension comprising a saturated aqueous sodium bicarbonate solution containing sodium bicarbonate in excess of that soluble in said water, adding an aqueous solution of sodium hydroxide and cyanuric acid, the latter being in the molecular ratio of three to one in said aqueous solution added, while keeping the temperature between 0° and 5° C., chlorine being also added during the addition of said aqueous solution.

6. A process of preparing trichloro-cyanuric acid comprising treating an aqueous solution of sodium cyanurate with an aqueous solution of a substance comprising aqueous saturated sodium bicarbonate solution that had been previously saturated with chlorine, said treating and said saturation being at a temperature not higher than ordinary room temperature, said sodium cyanurate solution being the reaction product in water of about 1 mol cyanuric acid and 3 mols sodium hydroxide.

7. The process of claim 6, said treating and said saturation being at 0° to about 5° C.

References Cited in the file of this patent

UNITED STATES PATENTS

| 2,184,888 | Muskat | Dec. 26, 1939 |
| 2,607,738 | Hardy | Aug. 19, 1952 |

OTHER REFERENCES

Chattaway et al.: Journal of the Chemical Society, vol. 81, p. 200 (1902).

Hands et al.: Journal of the Society of Chemical Industry, vol. 67, p. 67 (1948).